May 30, 1950  H. VAUDOUX ET AL  2,509,750
FIXED FRAME AERIAL FOR AIRCRAFT RADIOGONIOMETRY
Filed May 29, 1947  2 Sheets-Sheet 1
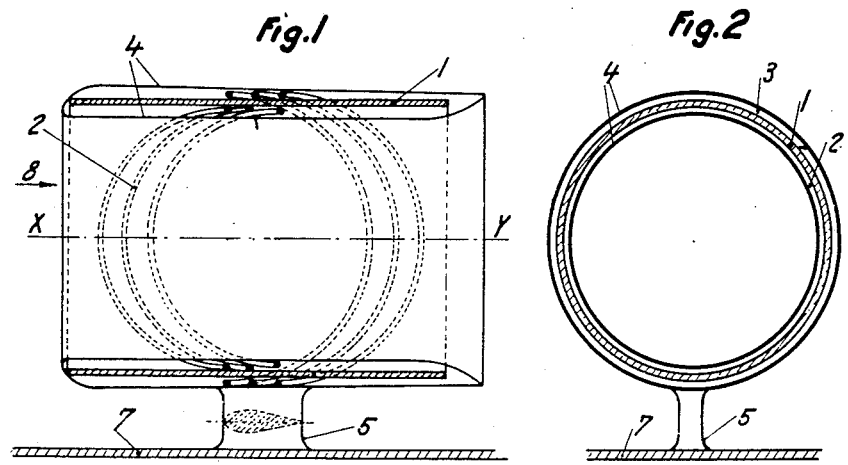
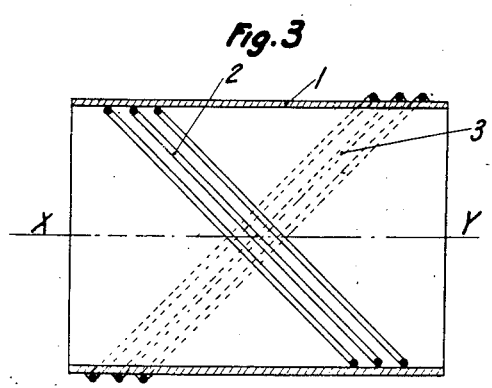
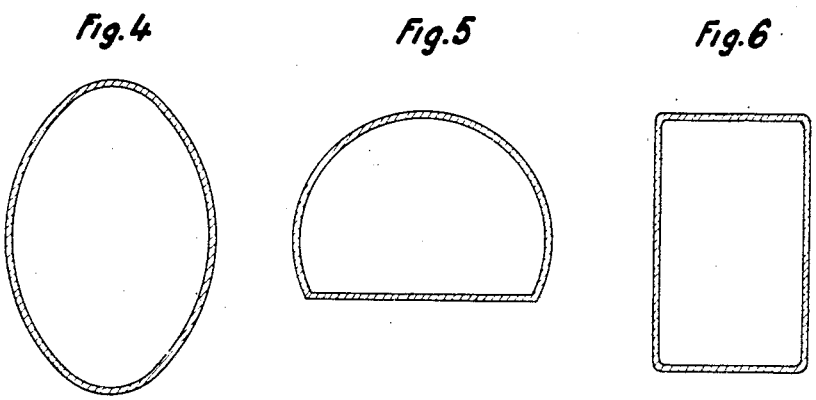
Inventors
HENRY VAUDOUX &
EMILE TORCHEUX
By Haseltine, Lake & Co.
Agents Inventors
HENRY VAUDOUX &
EMILE TORCHEUX
By Haseltine, Lake & Co.
Agents Patented May 30, 1950

2,509,750

UNITED STATES PATENT OFFICE 2,509,750

FIXED FRAME AERIAL FOR AIRCRAFT RADIOGONIOMETRY

Henry Vaudoux and Emile Torcheux, Paris, France, assignors to Societe Francaise Radio-Electrique, a corporation of France Application May 29, 1947, Serial No. 751,172
In France March 8, 1939

Section 1, Public Law 690, August 8, 1946
Patent expires March 8, 1959

9 Claims. (Cl. 250—33.67)

The object of the present invention is a fixed frame aerial for aircraft, which is provided with a dual winding and which produces little frontal resistance.

According to the invention this result is obtained by arranging the two windings and their support in such a manner as to form a hollow body of substantially cylindrical shape, or preferably of cylindrical and streamline shape, in order to offer a very reduced resistance to the wind.

The invention will be clearly understood by reference to the accompanying drawings which give, by way of non-limitative examples, various embodiments of the invention, and wherein:

Figure 1 is a longitudinal elevation partly in section, of one embodiment of our invention as mounted on an aircraft fuselage.

Figure 2 is an end elevation partly in section.

Figure 3 is a longitudinal section.

Figures 4, 5 and 6 show modified forms of the cross-section of the coil support.

In Figures 1 and 2, I shows an insulating support of hollow circular cylindrical shape, at 2 a first winding fixed to the inner face of said cylinder, at 3 a second winding fixed to its outer face and at 4 a cover of streamline shape which covers and protects the whole arrangement. The whole arrangement is fixed, by means of a base 5, likewise of streamline shape, to a wall 7 of the fuselage in such a manner that the axis XY of the hollow cylinder is parallel to the general direction of the air stream, shown at 8.

The arrangement of the two windings 2 and 3 on the insulated cylinder I is more clearly shown in Figure 3 which shows these elements in axial section in a plane perpendicular to that of Figure 1.

In this case the windings 2 and 3 are substantially identical, which gives them substantially the same electrical characteristics (self-inductance and distributed capacity). They may, while conforming to the shape of the cylinder and thus offering a very small frontal resistance, be arranged at right angles with respect to one another or form an angle other than 90°.

When the cross-section of the cylinder is circular, as in the previous figures, the turns themselves are elliptical. In order to give the turns a circular shape, which corresponds to the minimum inductance for a given area of the frame, it is possible, on the contrary, to use a cylinder of elliptical cross-section as shown in Figure 4.

It is, moreover, possible, without exceeding the scope of the invention, to use cylinders of any suitable shape for carrying the windings. Figure 5 shows for example, a cylinder of partly circular cross-section provided with a flat portion and Figure 6 a rectangular cross-section.

Figure 7:
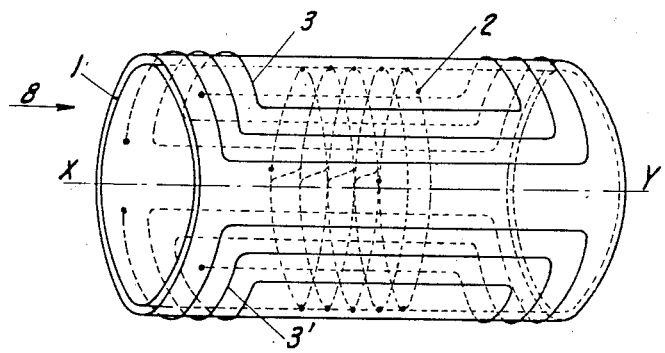
Figure 7 is a perspective view of the insulation form with a modified arrangement of coils thereon.
Figure 8:
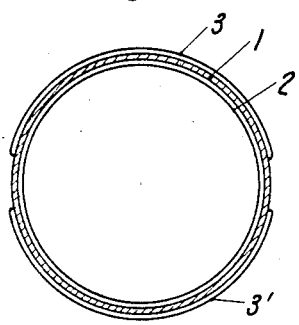
Figure 8 is a cross-section of the arrangement shown in Figure 7.

Figures 7 and 8 show other forms of right angle or substantially right angle windings which can likewise, according to the invention, be arranged on a cylinder I of circular, elliptical, rectangular or similar cross-section.

In these figures one of the two windings 2 is always formed by helically wound turns or preferably by a series of parallel turns, at right angles to the axis XY. The other winding consists of two flat coils 3 and 3' mounted on either side of the cylinder. These latter coils, which may be connected in series or in parallel, are shown in Figure 7 in the form of wires which are parallel to the axis and which are connected to one another by circular elements, but it should be understood that these two coils, instead of being of substantially rectangular formation, could be produced by flattening them on the cylinder coils of any other shape, circular or elliptical for instance.

Figure 9:
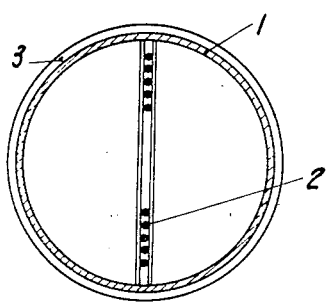
Figure 9 is a further modification showing the longitudinal partition housing a coil.

According to another modification of the invention, one of the windings could be arranged inside one or more partitions which are parallel to the axis of the cylinder and consequently only produce a slight drag. Such an arrangement is shown in Figure 9 in which I represents the cylinder acting as a support, 3 an outer winding consisting of circular turns which are at right angles to the axis of the cylinder, whereas the winding 2 is, in this case, formed by a flat coil arranged inside the cylinder in a diametric plane. These internal partitions, which are covered like the cylinder itself by a protecting cover, may moreover act mechanically as stays and efficiently contribute to the rigidity of the assembly.

It should be further understood that in all the foregoing arrangements the insulated cylinder which acts as a support for the windings and is itself placed inside a streamline insulated cover could if desired be omitted; the windings would in this case be directly fixed on the outside or preferably on the inside of said cover.

Finally it should be understood that instead of completely projecting from the fuselage 7 of the aircraft, which fuselage is in general made of metal, the frame, according to the invention, could if desired be fixed either directly to said fuselage, and forms such as those shown in Figure 5 or Figure 6 with a flat portion or even a slightly curved portion would in this case be very suitable or they may even be partly embedded in the fuselage in order to reduce the known edge effect which is due in particular to the closed loop formation of the metallic portions of the apparatus.

We claim:

1. A fixed frame aerial for aircraft radiogoniometry, comprising two coil windings with their respective magnetic axes out of alignment with each other arranged on a thin hollow insulating cylinder, the ends of the cylinder being open and means for mounting the cylinder with its axis in the mean diretcion of the air stream around the fuselage of the aircraft.

2. In a radiogoniometric frame aerial for aircraft, the combination comprising a cylindrical insulating body having a plane of symmetry and means for mounting the body at least partially exteriorly, of the fuselage of the aircraft, an insulating envelope of cross-section similar to said body and enveloping the same and having an axial symmetry, the axis of said envelope being parallel to the mean direction of air currents along the adjacent zone of the fuselage, two coil windings mounted on said body and housed in said envelope, the magnetic axes of said windings making a predetermined angle with each other, each of said windings comprising a plurality of turns having parallel magnetic axes.

3. A frame aerial according to claim 2, wherein the turns of one coil are supported on the interior surface of the body, those of the other winding on the exterior surface thereof, each of the turns having as its axis of symmetry the intersection of its plane with the plane of symmetry of the body, and the axes thus obtained in the two coils being equally inclined to the generatrix of the body cylinder.

4. A frame aerial according to claim 2, wherein the means for mounting the insulating envelope exteriorly of the fuselage comprises a streamlined base securing said envelope to the fuselage.

5. In a radiogoniometric frame aerial for aircraft, the combination comprising an insulating streamlined shell fixed to the fuselage and projecting from its hull, means comprising a hollow open-ended insulating cylinder for fixing in this shell two coils whose magnetic axes make a predetermined angle with each other, each of said coils comprising a plurality of turns having magnetic axes parallel to that of their coil, said cylinder being mounted in the mean direction of the airstream around the fuselage of the aircraft.

6. A radiogoniometric frame aerial for aircraft, the combination comprising an insulating thin-walled former having at least one plane of symmetry, two coils mounted on said former so that their magnetic axes make a given angle with each other, each of said coils comprising a plurality of turns having their magnetic axes parallel to the one of their winding, an insulating streamlined shell having an axis of symmetry, means to fix this former in the shell and the shell to the fuselage hull so that the former projects from this hull and the said symmetry axis is parallel to the means direction of the air streams flowing along the adjacent zone of the fuselage.

7. A frame aerial as claimed in claim 6, wherein the two coils are respectively composed of plane and parallel turns with axes of symmetry, the turns of one coil being wound on the inward face of the cylindrical former, those of the other coil on its outer face, the axis of symmetry of each turn being made by the intersection of its plane with the plane of symmetry of the former, and the axes of any couple of turns, respectively included in the two coils being equally inclined to the generatrices of the former which the two of them intersect.

8. A frame aerial as claimed in claim 6, wherein one of the coils is composed of identical, plane and parallel turns, which are fixed to the inward face of the cylindrical former perpendicularly to its generants, whilst the other coil is composed of two identical elements, wound on the outward face of said former symmetrically with respect to the plane of symmetry of this former.

9. A frame aerial as claimed in claim 6 wherein one of the coils is composed of identical, plane and parallel turns, wound on the outer face of a cylindrical former perpendicularly to its generants, the other coil being flat and mounted in a frame secured to the inward face of the former, in a plane parallel to the said generants.

HENRY VAUDOUX.
EMILE TORCHEUX.

REFERENCES CITED

The following references are of record in the file of this patent:

UNITED STATES PATENTS

| Number | Name | Date |
|---|---|---|
| 1,999,258 | Van B. Roberts | Apr. 30, 1935 |
| 2,383,415 | Polydoroff | Aug. 21, 1945 |
| 2,399,382 | Polydoroff | Apr. 30, 1946 |

FOREIGN PATENTS

| Number | Country | Date |
|---|---|---|
| 857,250 | France | Aug. 31, 1940 |